(12) United States Patent
Shin et al.

(10) Patent No.: US 8,879,033 B2
(45) Date of Patent: Nov. 4, 2014

(54) LIQUID CRYSTAL DISPLAY AND MANUFACTURING METHOD THEREOF

(75) Inventors: Yong Hwan Shin, Yongin-si (KR); Hak Sun Chang, Yongin-si (KR); Min-Sik Jung, Seoul (KR); Baek Kyun Jeon, Yongin-si (KR); Jun Woo Lee, Seongnam-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 123 days.

(21) Appl. No.: 13/616,906

(22) Filed: Sep. 14, 2012

(65) Prior Publication Data
US 2013/0128200 A1    May 23, 2013

(30) Foreign Application Priority Data

Nov. 23, 2011    (KR) .......................... 10-2011-0122969

(51) Int. Cl.
*G02F 1/1337*        (2006.01)
(52) U.S. Cl.
CPC .................................... *G02F 1/1337* (2013.01)
USPC ........................................ 349/129; 349/187
(58) Field of Classification Search
CPC ............ G02F 1/1337; G02F 1/133753; G02F 1/133788; G02F 2001/133757
USPC ................... 349/123, 128, 129, 130, 132, 187
See application file for complete search history.

(56) References Cited

U.S. PATENT DOCUMENTS

| 6,512,564 | B1 | 1/2003 | Yoshida et al. |
| 7,342,628 | B2 * | 3/2008 | Kim et al. ..................... 349/129 |
| 2003/0112394 | A1 | 6/2003 | Yoshda et al. |
| 2004/0233365 | A1 | 11/2004 | Yoshida et al. |
| 2007/0024784 | A1 | 2/2007 | Yoshida et al. |
| 2008/0309862 | A1 | 12/2008 | Yoshida et al. |
| 2008/0309863 | A1 | 12/2008 | Yoshida et al. |
| 2008/0316408 | A1 | 12/2008 | Yoshida et al. |
| 2008/0316409 | A1 | 12/2008 | Yoshida et al. |
| 2010/0321622 | A1 | 12/2010 | Yoshida et al. |
| 2010/0328602 | A1 | 12/2010 | Yoshida et al. |
| 2012/0038872 | A1 * | 2/2012 | Kang et al. ..................... 349/124 |

FOREIGN PATENT DOCUMENTS

| JP | 2008-181139 | 8/2008 |
| JP | 2008-181140 | 8/2008 |
| KR | 10-1998-071681 | 10/1998 |

* cited by examiner

*Primary Examiner* — Thoi Duong
(74) *Attorney, Agent, or Firm* — F. Chau & Associates, LLC

(57) ABSTRACT

A liquid crystal display, including a first substrate and a second substrate, each having a plurality of unit pixel areas and facing each other, and a liquid crystal layer between the first substrate and the second substrate, in which the plurality of unit pixel areas each have a plurality of domains. In a first domain of the plurality of domains, a first alignment layer of the first substrate and a second alignment layer of the second substrate are photo-aligned, and in a second domain of the plurality of domains, the second alignment layer of the second substrate is photo-aligned twice and the first alignment layer of the first substrate is not photo-aligned.

15 Claims, 15 Drawing Sheets

LIQUID CRYSTAL DISPLAY AND MANUFACTURING METHOD THEREOF

CROSS-REFERENCE TO RELATED APPLICATION

This application claims priority to and the benefit of Korean Patent Application No. 10-2011-0122969 filed in the Korean Intellectual Property Office on Nov. 23, 2011, the entire contents of which are incorporated herein by reference.

TECHNICAL FIELD

The present invention relates to a liquid crystal display and a manufacturing method thereof.

DISCUSSION OF THE RELATED ART

A liquid crystal display panel which is a type of flat panel display, includes substrates, each with field generating electrodes, and a liquid crystal layer interposed therebetween. The liquid crystal display generates an electric field in the liquid crystal layer by applying voltage to the field generating electrodes, and determines the direction/orientation of liquid crystal molecules of the liquid crystal layer by the generated electric field, thus controlling polarization of incident light so as to display images.

Among the liquid crystal displays, a vertically aligned mode liquid crystal display, in which a long axis of the liquid crystal molecules is arranged to be perpendicular to upper and lower display panels in the absence of an electric field, has a relatively high contrast ratio and a relatively wide reference viewing angle.

In order to implement a wide viewing angle in the vertical alignment mode liquid crystal display, a plurality of domains having different liquid crystal alignment directions may be formed in one pixel.

A plurality of domains may be formed in one pixel by forming a cutout in a field generating electrode. Liquid crystal molecules are aligned in a direction perpendicular to a fringe field by the fringe field formed between an edge of the cutout and the field generating electrode facing the edge, thereby forming the plurality of domains.

In the structure including the cutout, an aperture ratio may be reduced and deteriorated. Liquid crystal which is positioned close to the cutout may be easily aligned in the direction perpendicular to the fringe field, but in liquid crystal disposed away from the cutout, a random motion occurs such that a response speed decreases and a reverse directional domain is formed. As a result, a temporal afterimage may be displayed.

Another method of forming the plurality of domains in one pixel is a photo-alignment method, wherein light is irradiated on an alignment layer to control an alignment direction and an alignment angle of the liquid crystal. In the photo-alignment method, since it is not necessary to form a cutout in the field generating electrode, the aperture ratio may increase and a response time of the liquid crystal may be improved by a liquid crystal pretilt angle.

However, when two substrates facing each other are photo-aligned, an error in the pretilt angle can occur due to an arrangement error of the two substrates.

SUMMARY OF THE INVENTION

The embodiments of the present invention provide a liquid crystal display that implements a plurality of domains without reducing an aperture ratio of the liquid crystal display and that reduces pretilt angle errors due to an arrangement error of upper and lower substrates and a manufacturing method thereof.

An exemplary embodiment of the present invention provides a liquid crystal display, including a first substrate and a second substrate each having a plurality of unit pixel areas and facing each other, and a liquid crystal layer between the first substrate and the second substrate, in which the plurality of unit pixel areas each have a plurality of domains. In a first domain of the plurality of domains, a first alignment layer of the first substrate and a second alignment layer of the second substrate are photo-aligned, and in a second domain of the plurality of domains, the second alignment layer of the second substrate is photo-aligned twice and the first alignment layer of the first substrate is not photo-aligned.

In the first domain, the first alignment layer of the first substrate may be exposed and photo-aligned in a first direction and the second alignment layer of the second substrate may be exposed and photo-aligned in a second direction. In the second domain, the second alignment layer of the second substrate may be first exposed and photo-aligned in the second direction and then exposed and photo-aligned in a third direction, the first direction may form an angle of 90 degrees with the second direction, and the second direction may form an angle of 90 degrees with the third direction.

The photo-alignment directions of the first domain and the second domain may form an angle of 90 degrees with each other.

The liquid crystal display may further include a third domain photo-aligned in a direction forming an angle of 180 degrees with the photo-alignment direction of first domain. In the third domain, the first alignment layer of the first substrate may be exposed and photo-aligned in the third direction and the second alignment layer of the second substrate may be photo-aligned in a fourth direction, and the fourth direction may be opposite to the second direction.

The liquid crystal display may further include a fourth domain photo-aligned in a direction forming an angle of 90 degrees with the photo-alignment direction of the third domain. In the fourth domain, the first alignment layer of the first substrate may be first exposed and photo-aligned in the first direction and then exposed and photo-aligned in the fourth direction, and the second alignment layer of the second substrate may not be photo-aligned.

An exemplary embodiment of the present invention provides a liquid crystal display, including: a first substrate and a second substrate each having a plurality of unit pixel areas and facing each other, and a liquid crystal layer interposed between the first substrate and the second substrate, in which the plurality of unit pixel areas each have a plurality of domains. A first alignment layer of the first substrate is exposed and photo-aligned once in a first direction in a first domain. The first alignment layer of the first substrate is not photo-aligned in a second domain. The first alignment layer of the first substrate is exposed and photo-aligned once in a second direction in a third domain. The first alignment layer of the first substrate is first exposed and photo-aligned in the first direction and then exposed and photo-aligned in the second direction in a fourth domain.

The first direction may form an angle of 90 degrees with the second direction.

The second alignment layer of the second substrate may be exposed and photo-aligned once in a third direction in the first domain. The second alignment layer of the second substrate may be first exposed and photo-aligned in the third direction and then exposed and photo-aligned in a fourth direction in the second domain. The second alignment layer of the second substrate may be exposed and photo-aligned once in the fourth direction in the third domain, and the second alignment layer of the second substrate may not be photo-aligned in the fourth domain.

The third direction may form an angle of 90 degrees with the fourth direction.

The first direction may be opposite to the third direction and the second direction may be opposite to the fourth direction.

An exemplary embodiment of the present invention provides a method of manufacturing a liquid crystal display, including photo-aligning a first region of a first alignment layer of a first substrate in a first direction, photo-aligning a second region of the first alignment layer of the first substrate in a second direction, photo-aligning a first region of a second alignment layer of a second substrate in a third direction, photo-aligning a second region of the second alignment layer of the second substrate in a fourth direction, and arranging the first substrate and the second substrate to face each other. The first direction forms an angle of 90 degrees with the second direction and the third direction forms an angle of 90 degrees with the fourth direction.

The first region of the first alignment layer and the first region of the second alignment layer may not overlap with each other.

The second region of the first alignment layer and the second region of the second alignment layer may not overlap with each other.

The first region of the first alignment layer and the second region of the first alignment layer may partially overlap with each other.

The first region of the second alignment layer and the second region of the second alignment layer may partially overlap with each other.

A method for manufacturing a display device, according to an exemplary embodiment of the present invention, comprises photo-aligning a first alignment layer of a first substrate in a first direction and a second alignment layer of a second substrate in a second direction in a first domain of a pixel region of the display device, wherein the first and second directions are perpendicular to each other, photo-aligning the second alignment layer of the second substrate in the second direction and in a third direction in a second domain of the pixel region, wherein the first alignment layer of the first substrate is not photo-aligned in the second domain, and the third direction is perpendicular to the second direction, and arranging the first substrate to face the second substrate.

The method may further comprise photo-aligning the first alignment layer of the first substrate in the third direction and the second alignment layer of the second substrate in a fourth direction in a third domain of the pixel region, wherein the fourth direction is opposite to the second direction, and photo-aligning the first alignment layer of the first substrate in the first direction and in the fourth direction in a fourth domain of the pixel region, wherein the second alignment layer of the second substrate is not photo-aligned in the fourth domain.

According to the exemplary embodiments of the present invention, since each pixel electrode of the liquid crystal display includes a plurality of domains photo-aligned in different directions and in at least some of the domains, only one substrate of two substrates facing each other is photo-aligned and the other substrate is not photo-aligned, it is possible to reduce a pretilt direction error caused by an arrangement error of upper and lower substrates.

DETAILED DESCRIPTION

Figure 1:
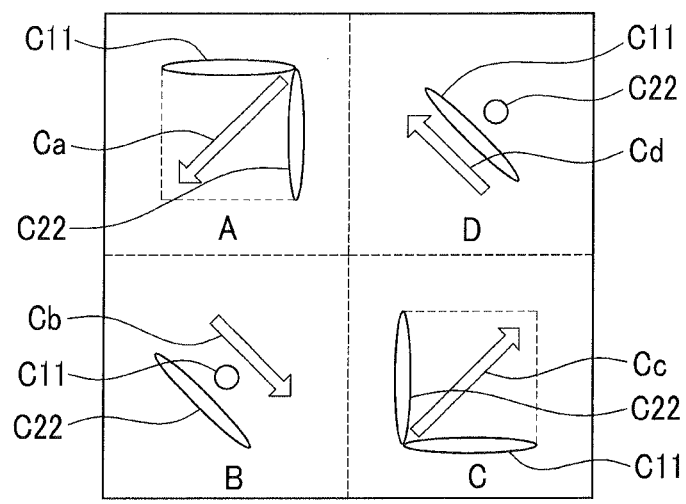
FIG. 1 is a plan view schematically illustrating a structure of a pixel electrode of a liquid crystal display according to an exemplary embodiment of the present invention.

The embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present. As used herein, the singular forms, "a," "an" and "the" are intended to include the plural forms as well, unless the context clearly indicates otherwise.

Referring to FIG. 1, a pixel of a liquid crystal display according to an exemplary embodiment of the present invention is described herein. FIG. 1 is a plan view schematically illustrating a structure of a pixel electrode of a liquid crystal display according to an exemplary embodiment of the present invention.

Referring to FIG. 1, a pixel of a liquid crystal display according to an exemplary embodiment of the present invention includes four domains A, B, C, and D. Alignment layers of the four domains are photo-aligned so as to have pretilt angles in different directions. In detail, the pixel includes four domains which are aligned in a lower left direction Ca, a lower right direction Cb, an upper right direction Cc, and an upper left direction Cd, based on a horizontal center line and a vertical center line dividing the four domains.

In a first domain A, a first alignment layer of a first substrate (wherein first and second substrates face each other) is photo-aligned with a liquid crystal molecule pretilt direction C11 from the right to the left and a second alignment layer of the second substrate is photo-aligned with a liquid crystal molecule pretilt direction C22 from the top to the bottom. As a result, the liquid crystal molecules are photo-aligned with the pretilt direction in the lower left direction by the vector sum of the pretilt direction C11 of the first substrate and the pretilt direction C22 of the second substrate in the first domain A.

In a second domain B, since the first alignment layer of the first substrate is not photo-aligned, the pretilt direction C11 is perpendicular to the surface of the first substrate. The second alignment layer of the second substrate is photo-aligned with the pretilt direction C22 toward the lower right. As a result, the liquid crystal molecules in the second domain B are photo-aligned with the pretilt direction in the lower right direction Cb by the pretilt direction C22.

In a third domain C, the first alignment layer of the first substrate is photo-aligned with a pretilt direction C11 from the bottom to the top and the second alignment layer the second substrate is photo-aligned with a pretilt direction C22 from the left to the right. As a result, the liquid crystal molecules are photo-aligned with the pretilt direction in the upper right direction Cc by the vector sum of the pretilt direction C11 of the first substrate and the pretilt direction C22 of the second substrate in the third domain C.

In a fourth domain D, since the first alignment layer of the first substrate is photo-aligned with the pretilt direction C11 toward the upper left and since the second alignment layer of the second substrate is not photo-aligned, the liquid crystal molecule pretilt direction C22 is perpendicular to the surface of the first substrate. As a result, the liquid crystal molecules in the fourth domain D are photo-aligned with the pretilt direction in the upper left direction Cd by the pretilt direction C11.

As described above, the pixel of the liquid crystal display according to the exemplary embodiment of the present invention includes a plurality of domains that are photo-aligned in the different directions. Further, in at least one of the plurality of domains, any one of the two substrates which face each other is not photo-aligned and only the remaining substrate is photo-aligned in that domain. Accordingly, when the two substrates are arranged, even though an arrangement error occurs, an error of the pretilt direction may be reduced. In more detail, in at least one of the plurality of domains, since any one of the two substrates which face each other is not photo-aligned and only the one of the two substrates in the domain is photo-aligned, the pretilt direction of the liquid crystal molecules according to the photo-alignment is determined by only one photo-aligned substrate, and is not influenced by an arrangement error of the substrates. Accordingly, unlike the case where both substrates facing each other are photo-aligned in all the domains to determine the pretilt direction of the liquid crystal molecules by the vector sum of the photo-alignment directions of the two substrates, the error of the pretilt direction may be reduced by only photo-aligning one of the substrates in one or more domains of each pixel.

Figure 2:
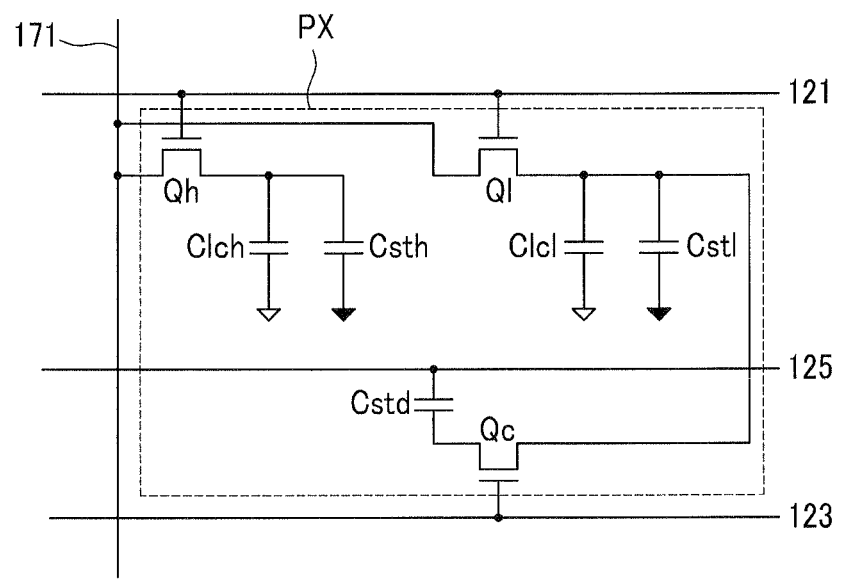
FIG. 2 is an equivalent circuit diagram for one pixel of a liquid crystal display according to an exemplary embodiment of the present invention.
Figure 3:
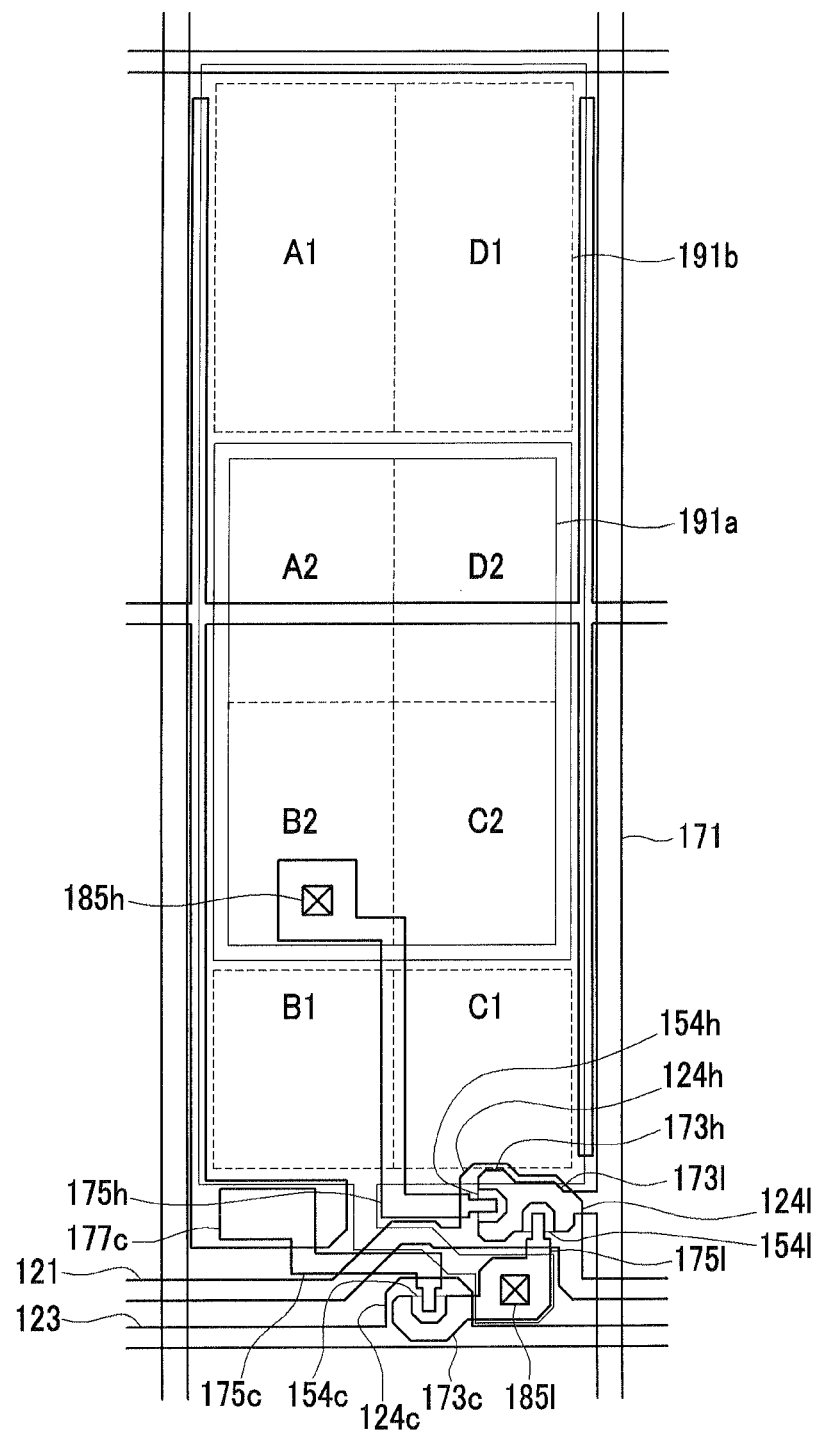
FIG. 3 is a layout view of a liquid crystal display according to an exemplary embodiment of the present invention.

A liquid crystal display according to an exemplary embodiment of the present invention is described herein with reference to FIGS. 2 and 3. FIG. 2 is an equivalent circuit diagram for one pixel of a liquid crystal display according to an exemplary embodiment of the present invention and FIG. 3 is a layout view of a liquid crystal display according to an exemplary embodiment of the present invention.

Referring to FIG. 2, the liquid crystal display according to the exemplary embodiment of the present invention includes a gate line 121, a storage electrode line 125, a voltage-reducing gate line 123, and a data line 171 and pixels PX connected thereto.

The pixel PX includes first, second and third switching elements Qh, Ql, and Qc, first and second liquid crystal capacitors Clch and Clcl, first and second storage capacitors Csth and Cstl, and a voltage-reducing capacitor Cstd. Herein, the first, second and third switching elements Qh, Ql and Qc are first, second and third thin film transistors Qh, Ql and Qc, respectively.

The first and second switching elements Qh and Ql are connected to the gate line 121 and the data line 171, respectively and the third switching element Qc is connected to the voltage-reducing gate line 123.

The first and second switching elements Qh and Ql are three-terminal elements, such as a thin film transistor, disposed at a lower panel. Control terminals of the first and second switching elements are connected to the gate lines 121, input terminals thereof are connected to the data lines 171, and output terminals thereof are connected to the first and second liquid crystal capacitors Clch and Clcl and to the first and second storage capacitors Csth and Cstl, respectively.

The third switching element Qc is also a three-terminal element such as a thin film transistor disposed at a lower panel. A control terminal of the third switching element is connected to the voltage-reducing gate line 123, an input terminal thereof is connected to the second liquid crystal capacitor Clcl, and an output terminal thereof is connected to the voltage-reducing capacitor Cstd.

The first and second liquid crystal capacitors Clch and Clcl are formed by overlapping first and second subpixel electrodes 191a and 191b connected to the first and second switching elements Qh and Ql with a common electrode (not shown) of an upper panel, respectively. The first and second storage capacitors Csth and Cstl are formed by overlapping the storage electrode line 125 including the storage electrode with the first and second subpixel electrodes 191a and 191b, respectively.

The voltage-reducing capacitor Cstd is connected to the output terminal of the third switching element Qc and the storage electrode line 125 and formed by overlapping the storage electrode line 125 disposed at the lower panel with the output terminal of the third switching element Qc with an insulator between the storage electrode line 125 and the output terminal of the third switching element Qc.

Referring to FIG. 3, in the lower panel, first/second/third gate electrodes 124h/124l/124c, first/second/third source electrodes 173h/173l/173c, and first/second/third drain electrodes 175h/175l/175c form first/second/third thin film transistors (TFTs) Qh/Ql/Qc together with first/second/third semiconductors 154h/154l/154c, respectively and a channel of the thin film transistor is formed at each of the semiconductors 154h/154l/154c between each of the source electrodes 173h/173l/173c and each of the drain electrodes 175h/175l/175c, respectively.

The first subpixel electrode 191a and the second subpixel electrode 191b receive data voltages from the first drain electrode 175h and the second drain electrode 175l, respectively, through respective first and second contact holed 185h and 185l. The second subpixel electrode 191b is physically and electrically connected to the third source electrode 173c.

When a gate-on signal is applied to the gate line 121, the first and second switching elements Qh and Ql connected thereto are turned on. As a result, the data voltage applied to the data line 171 is applied to the first and second subpixel electrodes 191a and 191b through the turned-on first and second switching elements Qh and Ql. In this case, the voltages applied to the first and second subpixel electrodes 191a and 191b are the same as each other. Then, when the gate-on signal is applied to the voltage-reducing gate line 123, the first and second switching elements Qh and Ql are turned off and the third switching element Qc is turned on. Then, charges move from the second subpixel electrode 191b to the third drain electrode 175c through the third switching element Qc. Then, the charged voltage of the second liquid crystal capacitor Clcl is lowered and the voltage-reducing capacitor Cstd is charged. The charged voltage of the second liquid crystal capacitor Clcl is lowered by the capacitance of the voltage-reducing capacitor Cstd, such that the charged voltage of the second liquid crystal capacitor Clcl is lower than the charged voltage of the first liquid crystal capacitor Clch.

In this case, the charged voltages of the two liquid crystal capacitors Clch and Clcl represent different gamma curves and a gamma curve of one pixel voltage is a curve obtained by composing the different gamma curves. The composed gamma curve for the front is in accordance with a reference gamma curve for the front determined to be most suitable and the composed gamma curve for the side is the closest to the reference gamma curve for the front. As described above, side visibility is improved by converting video data.

The two subpixel electrodes 191a and 191b include a plurality of domains as show in FIG. 1, respectively. As a result, inclined directions of the liquid crystal molecules in each domain are different from each other. As described above, when the inclined directions of the liquid crystal molecules are verified, a reference viewing angle of the liquid crystal display increases.

For example, an area corresponding to the first subpixel electrode 191a has four domains A1, B1, C1, and D1 and an area corresponding to the second subpixel electrode 191b has four domains A2, B2, C2, and D2.

According to an embodiment, each of the domains A1, B1, C1, D1 and A2, B2, C2, D2 are aligned with pretilts in different directions in the plurality of domains as described with reference to FIG. 1.

In detail, the first domain A1 of the first subpixel electrode 191a and the first domain A2 of the second subpixel electrode 191b are photo-aligned with the pretilt in the lower left direction. As described with reference to FIG. 1, in the first domain A1 of the first subpixel electrode 191a and the first domain A2 of the second subpixel electrode 191b, a first alignment layer of the first substrate is photo-aligned with the pretilt direction C11 from the right to the left and a second alignment layer of the second substrate is photo-aligned with the pretilt direction C12 from the top to the bottom. As a result, the liquid crystal molecules are photo-aligned with the pretilt direction to the lower left Ca by the vector sum of the pretilt direction C11 of the first substrate and the pretilt direction C22 of the second substrate.

The second domain B1 of the first subpixel electrode 191a and the second domain B2 of the second subpixel electrode 191b are photo-aligned with the pretilt in the lower right direction. As described with reference to FIG. 1, in the second domain B1 of the first subpixel electrode 191a and the second domain B2 of the second subpixel electrode 191b, since the first substrate in the second domain is not photo-aligned, the liquid crystal molecule pretilt direction C11 is perpendicular to the surface of the first substrate. The second alignment layer of the second substrate in the second domain is photo-aligned with the pretilt direction C22 in the lower right direction. As a result, the liquid crystal molecules in the second domain B1 and B2 are photo-aligned with the pretilt direction in the lower right direction Cb by the pretilt direction C22.

The third domain C1 of the first subpixel electrode 191a and the third domain C2 of the second subpixel electrode 191b are photo-aligned with the pretilt in the upper right direction. As shown in FIG. 1, in the third domain C1 of the first subpixel electrode 191a and the third domain C2 of the second subpixel electrode 191b, the first alignment layer of the first substrate is photo-aligned with the pretilt direction C11 from the bottom to the top and the second alignment layer of the second substrate is photo-aligned with the pretilt direction C22 from the left to the right. As a result, the liquid crystal molecules in the third domain are photo-aligned with the pretilt direction in the upper right direction Cc by the vector sum of the pretilt direction C11 of the first substrate and the pretilt direction C22 of the second substrate.

The fourth domain D1 of the first subpixel electrode 191a and the fourth domain D2 of the second subpixel electrode 191b are photo-aligned with the pretilt in the upper left direction. As shown in FIG. 1, in the fourth domain D1 of the first subpixel electrode 191a and the fourth domain D2 of the second subpixel electrode 191b, the first alignment layer of the first substrate is photo-aligned with the pretilt direction C11 in the upper left direction and the second alignment layer of the second substrate is not aligned, such that the pretilt direction C22 in the fourth domain is perpendicular to the surface of the first substrate. As a result, in the fourth domain, the liquid crystal molecules are photo-aligned with the pretilt direction in the upper left direction Cd by the pretilt direction C11.

As described above, a pixel of the liquid crystal display according to an exemplary embodiment of the present invention includes the plurality of domains photo-aligned in the different directions. Further, in at least one of the plurality of domains, any one of the two substrates facing each other is not photo-aligned and only the remaining substrate is photo-aligned. Accordingly, when the two substrates are arranged, even though the arrangement error occurs, an error of the pretilt direction due to the arrangement error of the two substrates may be reduced or prevented. In more detail, in at least one of the plurality of domains, since any one of the two substrates facing each other is not photo-aligned and only the remaining substrate is photo-aligned, the pretilt direction of the liquid crystal molecules according to the photo-alignment is determined by only one photo-aligned substrate, and is therefore not influenced by an arrangement error of the substrates facing each other. Therefore, unlike the case where both substrates facing each other are photo-aligned in all the domains such that the pretilt direction of the liquid crystal molecules is determined by the vector sum of the photo-alignment directions of the two substrates, an error of the pretilt direction due to an arrangement error of the two substrates may be reduced.

A manufacturing method of a liquid crystal display according to an exemplary embodiment of the present invention is described with reference to FIGS. 4 to 8.

An alignment material for photo-aligning a liquid crystal display according to the exemplary embodiment of the present invention can include a photosensitive polymer material. For example, according to an embodiment, the alignment material includes polyimide main chains and side chains connected to the polyimide main chains and the side chains have double bonds so that the side chain has directivity. Further, when a polarization ultraviolet light polarized in a predetermined direction is irradiated onto randomly-arranged photosensitive polymer materials, photo reaction groups having directivity perpendicular or horizontal to the polarization direction of the polarization ultraviolet light are photo-polymerized. For example, when the ultraviolet (UV) light having a polarization axis on the same plane as the direction of the side chain is incident on the polymer material, the side chains are photo-polymerized to have structural anisotropy and a pretilt direction inclined in an incident direction of the ultraviolet (UV) light. In a manufacturing method of the liquid crystal display according to an exemplary embodiment of the present invention, a photosensitive polymer layer is formed in at least some regions of the first substrate and the second substrate and the polarization ultraviolet light is used as light for photo-alignment. Further, it is assumed that the photo-alignment polymers of the photosensitive polymer layer have directivity in a direction where the polarization ultraviolet (UV) light is irradiated. Alternatively, in an exemplary embodiment, photo-alignment polymers having directivity in an opposite direction to the direction where the polarization ultraviolet (UV) light is irradiated can be used. Further, in an exemplary embodiment, other light instead of the ultraviolet (UV) light can be used or an ion beam can be used.

Figure 4:
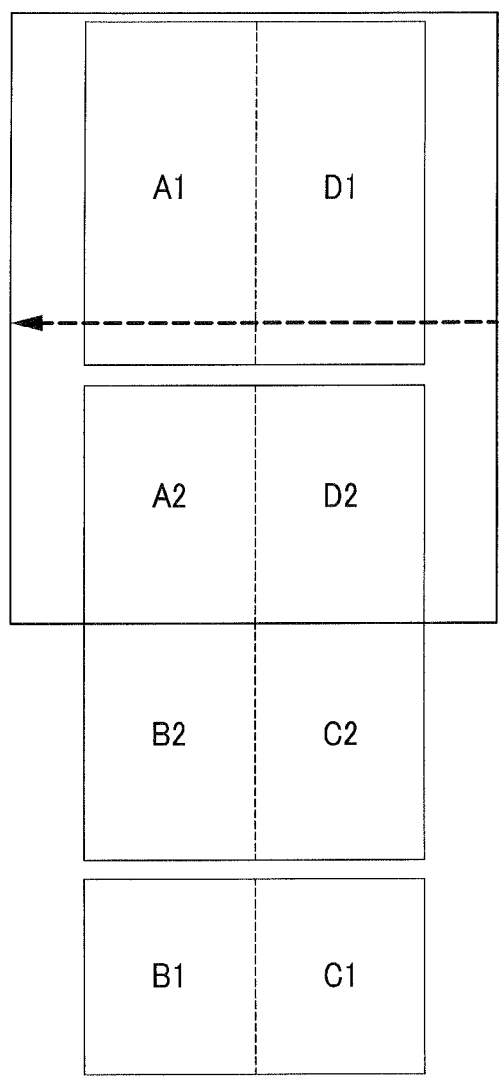
FIGS. 4 to 8 are plan views illustrating a photo-alignment method of a liquid crystal display according to an exemplary embodiment of the present invention.

First, referring to FIG. 4, some regions of the first substrate are photo-aligned in a first direction. In detail, regions corresponding to the first domain A1 and the fourth domain D1 of the first subpixel electrode 191a and regions corresponding to the first domain A2 and the fourth domain D2 of the second subpixel electrode 191b are exposed and photo-aligned in the first direction.

Figure 5:
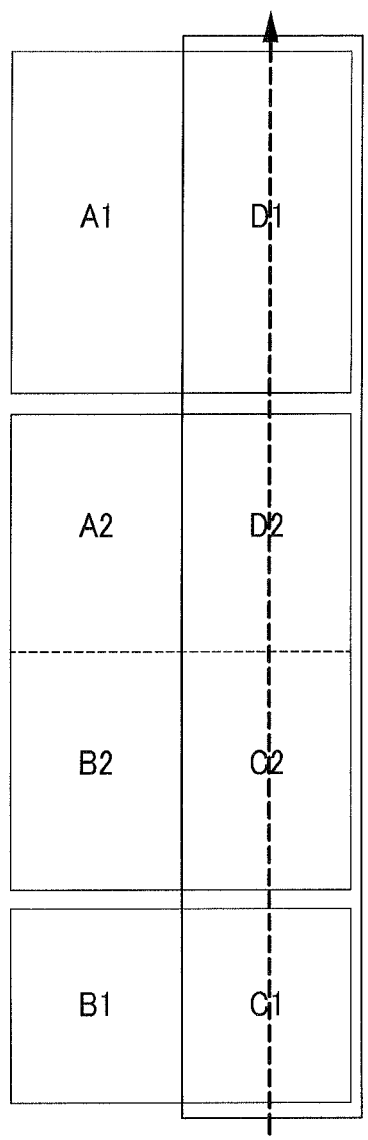

Thereafter, as shown in FIG. 5, some regions of the first substrate are exposed and photo-aligned in a second direction. According to an embodiment, the second direction forms an angle of 90 or about 90 degrees with the first direction. In detail, regions corresponding to the third domain C1 and the fourth domain D1 of the first subpixel electrode 191a and regions corresponding to the third domain C2 and the fourth domain D2 of the second subpixel electrode 191b are exposed and photo-aligned in the second direction.

Figure 6:
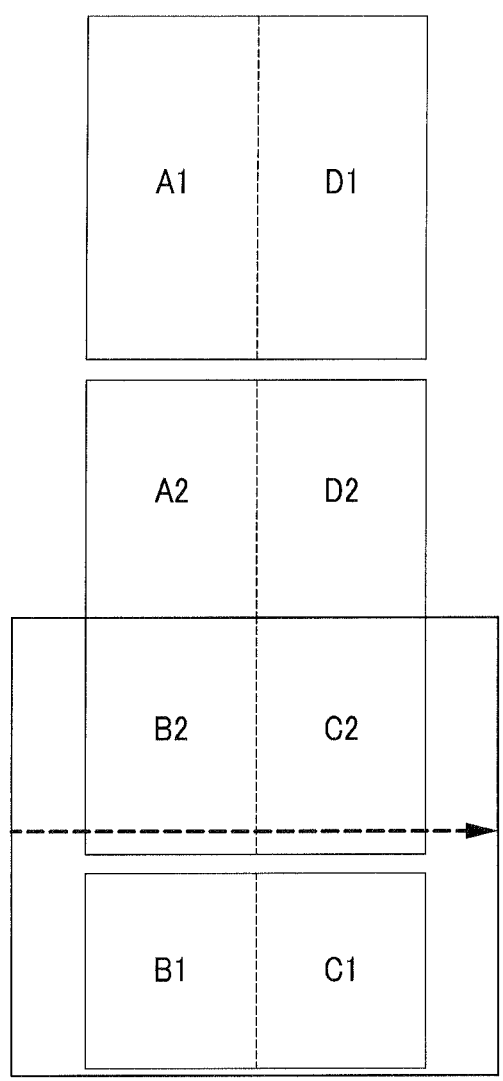

As shown in FIG. 6, some regions of the second substrate are exposed and photo-aligned in a third direction. According to an embodiment, the third direction is opposite to the first direction. In detail, regions corresponding to the second domain B1 and the third domain C1 of the first subpixel electrode 191a and regions corresponding to the second domain B2 and the third domain C2 of the second subpixel electrode 191b, which are regions corresponding to the regions except for the first exposure regions of the first substrate, are exposed and photo-aligned in the third direction.

Figure 7:
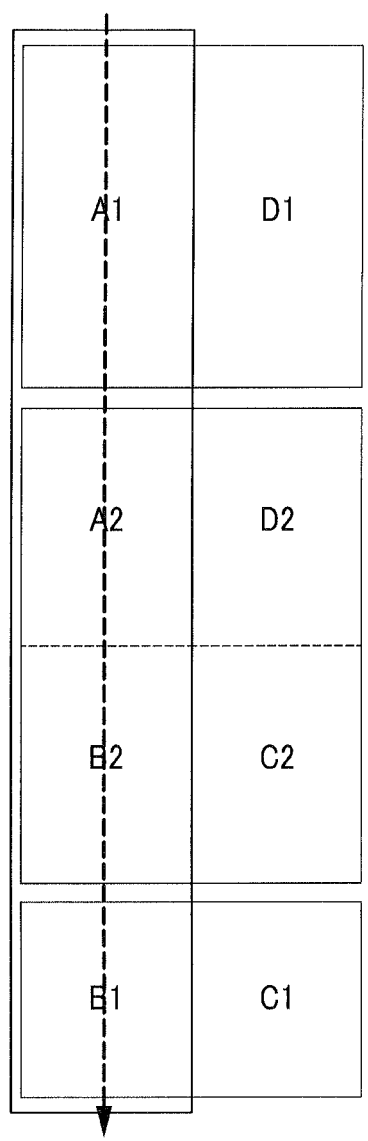

Next, as shown in FIG. 7, some regions of the second substrate are exposed and photo-aligned in a fourth direction. According to an embodiment, the fourth direction forms an angle of 90 or about degrees with the third direction. In detail, regions corresponding to the first domain A1 and the second domain B1 of the first subpixel electrode 191a and regions corresponding to the first domain A2 and the second domain B2 of the second subpixel electrode 191b, which are regions corresponding to the regions except for the second exposure regions of the first substrate, are exposed and photo-aligned in the fourth direction.

Thereafter, the liquid crystal molecules are aligned with the pretilts in different directions in each domain by arranging the first substrate and the second substrate and interposing a liquid crystal layer between the two substrates.

Figure 8:
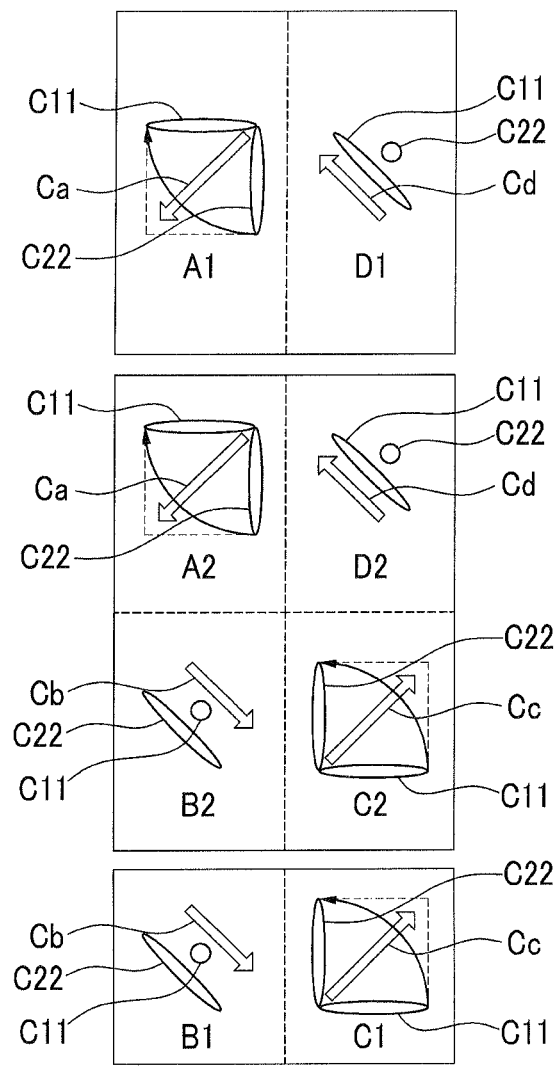

As a result, as shown in FIG. 8, in the first domain A1 of the first subpixel electrode 191a and the first domain A2 of the second subpixel electrode 191b, the first alignment layer of the first substrate is photo-aligned with the pretilt direction C11 in the first direction and the second alignment layer of the second substrate is photo-aligned with the pretilt direction C22 in the fourth direction. Accordingly, the liquid crystal molecules are photo-aligned with the pretilt directions in the lower left direction Ca by the vector sum of the pretilt direction C11 of the first substrate and the pretilt direction C22 of the second substrate.

In the second domain B1 of the first subpixel electrode 191a and the second domain B2 of the second subpixel electrode 191b, the first substrate is not photo-aligned, such that the pretilt direction C11 of the liquid crystal molecules adjacent to the first substrate in the second domain is perpendicular to the surface of the first substrate. The second alignment layer of the second substrate in the second domain is photo-aligned with a pretilt direction C22 of the adjacent liquid crystal molecules in the lower right direction. As a result, the liquid crystal molecules are photo-aligned with the pretilt direction in the lower right direction Ca by the pretilt direction C22 of the liquid crystal molecules adjacent to the second substrate in the second domain.

In the third domain C1 of the first subpixel electrode 191a and the third domain C2 of the second subpixel electrode 191b, the first alignment layer of the first substrate is photo-aligned with the pretilt direction C11, which is the second direction from the bottom to the top, and the second alignment layer of the second substrate is photo-aligned with the pretilt direction C22, which is the second direction from the left to the right. As a result, the liquid crystal molecules in the third domain are photo-aligned with the pretilt direction in the upper right direction Cc by the vector sum of the pretilt direction C11 of the first substrate and the pretilt direction C22 of the second substrate.

In the fourth domain D1 of the first subpixel electrode 191a and the fourth domain D2 of the second subpixel electrode 191b, the first alignment layer of the first substrate is photo-aligned with the pretilt direction C11 in the upper left direction and the second alignment layer of the second substrate is not aligned, such that the pretilt direction C22 of the liquid crystal molecules adjacent to the second substrate in the fourth domain is perpendicular to the surface of the second substrate. As a result, the liquid crystal molecules in the fourth domain are photo-aligned with the pretilt direction in the upper left direction Cd by the pretilt direction C11 of the liquid crystal molecules adjacent to the first substrate.

As described above, in a photo-alignment method according to an exemplary embodiment of the present invention, some regions of the same substrate are exposed twice in directions forming the angle of 90 or about 90 degrees with each other and two different regions of the two different substrates are exposed in opposite directions to each other.

As a result, in the case of the first substrate, the first domains A1 and A2 are exposed and photo-aligned once in the first direction and the second domains B1 and B2 are not photo-aligned. The third domains C1 and C2 are exposed and photo-aligned once in the second direction only and the fourth domains D1 and D2 are exposed and photo-aligned twice, that is, in the first direction and the second direction which are perpendicular to each other.

In the case of the second substrate, the first domains A1 and A2 are exposed and photo-aligned once in the third direction only and the second domains B1 and B2 are exposed and photo-aligned twice, that is in the third direction and the fourth direction which are perpendicular to each other. The third domains C1 and C2 are exposed and photo-aligned once in the fourth direction and the fourth domains D1 and D2 are not photo-aligned.

In the photo-alignment method, the first domains A1 and A2 and the third domains C1 and C2 are aligned with pretilts obtained by vector sums by exposing and photo-aligning the first substrate and the second substrate once in the directions perpendicular to each other, respectively and the second domains B1 and B2 and the fourth domains D1 and D2 are aligned with pretilts obtained by the exposure direction of the photo-aligned substrate by exposing and photo-aligning any one substrate of the first substrate and the second substrate twice in directions perpendicular to each other and not photo-aligning the remaining substrate in the second and fourth domains.

According to an embodiment, when the same substrate is exposed and photo-aligned twice, a light amount in the first exposure can be about three times more than the light amount of the second exposure.

As described above, according to a manufacturing method of a liquid crystal display according to an exemplary embodiment of the present invention, in at least one of the plurality of domains, any one of the two substrates facing each other is not photo-aligned and only the remaining substrate is photo-aligned in that domain. Accordingly, when the two substrates are arranged to face each other, even though an arrangement error occurs (such as, for example, shifting of one or both of the substrates from its position), an error of the pretilt direction due to the arrangement error of the two substrates may be reduced or prevented. In more detail, in at least one of the plurality of domains, since any one of the two substrates facing each other is not photo-aligned and only the remaining substrate is photo-aligned, the pretilt direction of the liquid crystal molecules according to the photo-alignment is determined by only one photo-aligned substrate in a particular domain(s), and is therefore, not influenced by the arrangement error. Therefore, unlike the case where both substrates facing each other are photo-aligned in all the domains such that the pretilt direction of the liquid crystal molecules is determined by the vector sum of the photo-alignment directions of the two substrates, an error of the pretilt direction due to an arrangement error of the two substrates may be reduced or prevented.

According to a manufacturing method according to an exemplary embodiment of the present invention, the first direction and the second direction, and the third direction and the fourth direction may be opposite directions to the directions described in the manufacturing method according to the exemplary embodiment described in connection with FIGS. 4-8, and the exposure regions may also be changed.

Figure 9:
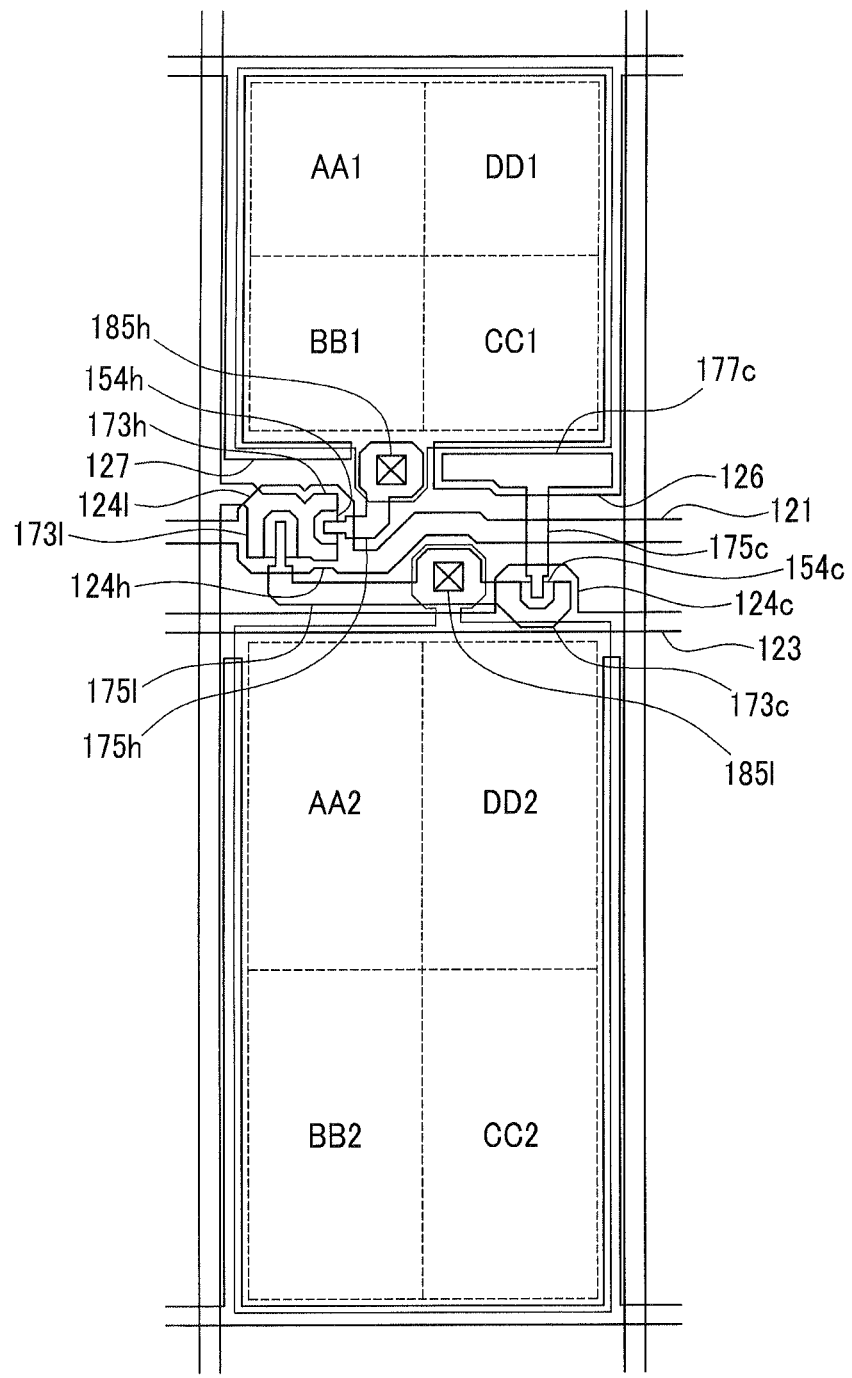
FIG. 9 is a layout view of a liquid crystal display according to an exemplary embodiment of the present invention.

Hereinafter, a liquid crystal display according to an exemplary embodiment of the present invention will be described with reference to FIG. 9 together with FIG. 2. Referring to FIG. 9, constituent elements such as the signal lines and the switching elements are the same as or similar to those of the liquid crystal display according to the exemplary embodiment shown in FIG. 3. In the case of the liquid crystal display according to the exemplary embodiment described in connection with FIG. 9, positions of the first pixel electrode 191a and the second pixel electrode 191b are different from those of the liquid crystal display according to the exemplary embodiment described in connection with FIG. 2.

Referring to FIG. 9, the first pixel electrode 191a and the second pixel electrode 191b are disposed in a pixel column direction in a line based on signal lines 121 and 123 and switching elements Qh, Ql, and Qc.

Like the liquid crystal display described in connection with FIG. 3, each of the first pixel electrode 191a and the second pixel electrode 191b includes a plurality of domains as shown in FIG. 1. As a result, in each pixel electrode inclined directions of the liquid crystal molecules are different from each other in each domain. As described above, when the inclined directions of the liquid crystal molecules are varied, a reference viewing angle of the liquid crystal display increases.

For example, an area corresponding to the first subpixel electrode 191a has four domains AA1, BB1, CC1, and DD1 and an area corresponding to the second subpixel electrode 191b has four domains AA2, BB2, CC2, and DD2.

According to an embodiment, each of the domains AA1, BB1, CC1, DD1 and AA2, BB2, CC2, DD2 of each respective subpixel electrode 191a, 191b are aligned with the pretilts in different directions like the plurality of domains as described with reference to FIG. 1.

In detail, the first domain AA1 of the first subpixel electrode 191a and the first domain AA2 of the second subpixel electrode 191b are photo-aligned with the pretilt in the lower left direction.

The second domain BB1 of the first subpixel electrode 191a and the second domain BB2 of the second subpixel electrode 191b are photo-aligned with the pretilt in the lower right direction.

The third domain CC1 of the first subpixel electrode 191a and the third domain CC2 of the second subpixel electrode 191b are photo-aligned with the pretilt in the upper right direction.

The fourth domain DD1 of the first subpixel electrode 191a and the fourth domain DD2 of the second subpixel electrode 191b are photo-aligned with the pretilt in the upper left direction.

A manufacturing method of a liquid crystal display according to an exemplary embodiment of the present invention is described with reference to FIGS. 10 to 14.

Figure 10:
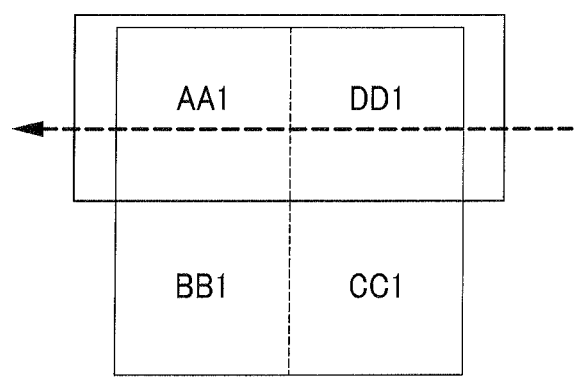
FIGS. 10 to 14 are plan views illustrating a photo-alignment method of a liquid crystal display according to an exemplary embodiment of the present invention.
Figure 10:
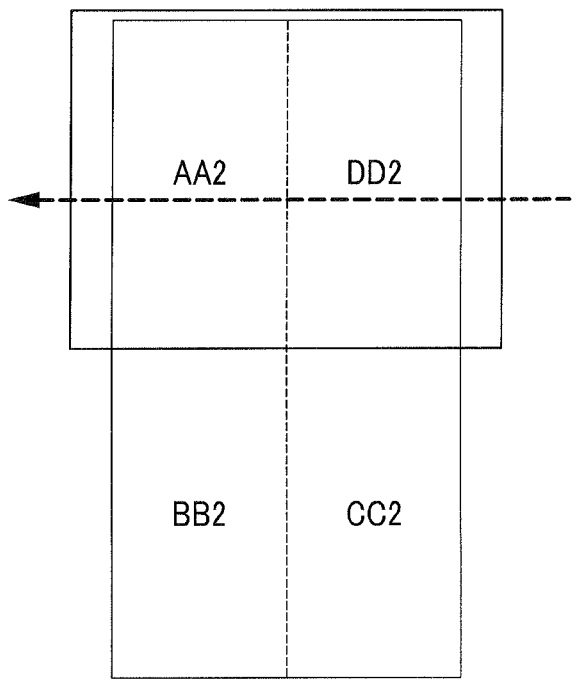

Referring to FIG. 10, some regions of the first substrate are photo-aligned in a first direction. In detail, regions corresponding to the first domain AA1 and the fourth domain DD1 of the first subpixel electrode 191a and regions corresponding to the first domain AA2 and the fourth domain DD2 of the second subpixel electrode 191b are exposed and photo-aligned in the first direction.

Figure 11:
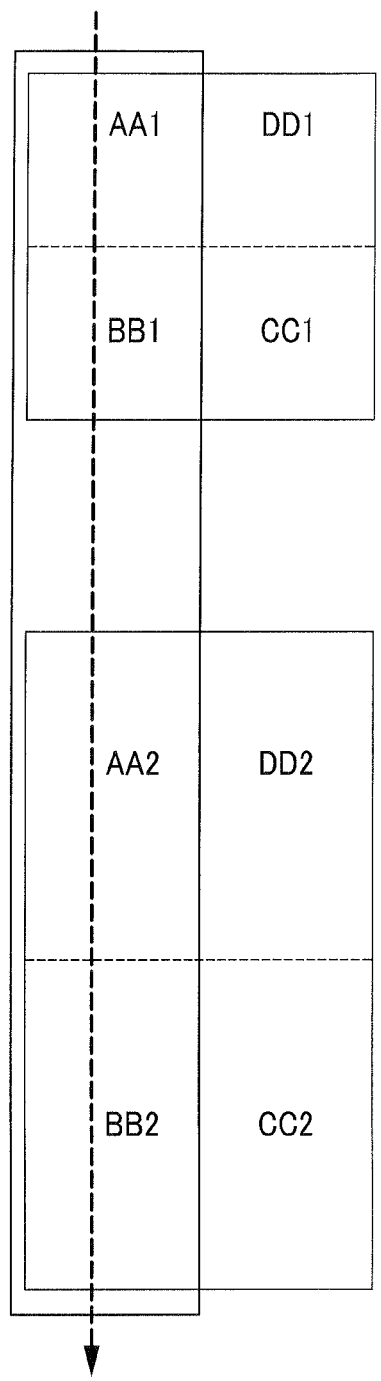

Thereafter, as shown in FIG. 11, some regions of the first substrate are exposed and photo-aligned in a second direction. According to an embodiment, the second direction forms an angle of 90 degrees or about 90 degrees with the first direction. In detail, regions corresponding to the first domain AA1 and the second domain BB1 of the first subpixel electrode 191a and regions corresponding to the first domain AA2 and the second domain BB2 of the second subpixel electrode 191b are exposed and photo-aligned in the second direction.

Figure 12:
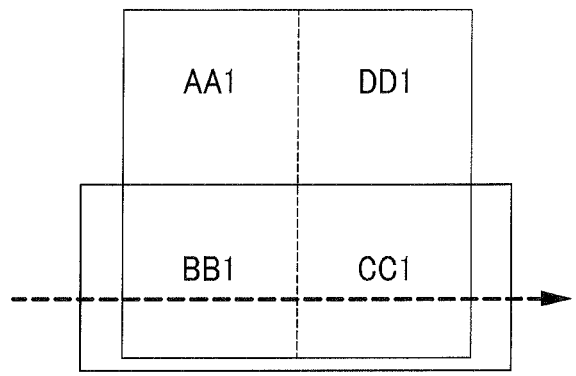
Figure 12:
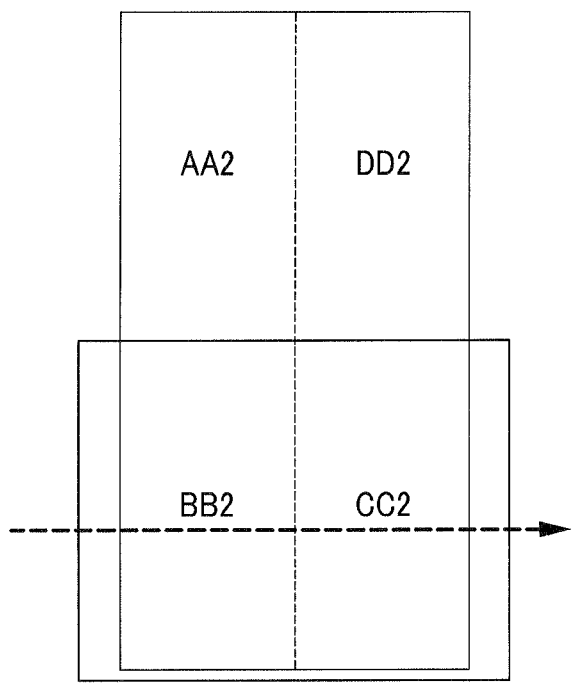

As shown in FIG. 12, some regions of the second substrate are exposed and photo-aligned in a third direction. According to an embodiment, the third direction is opposite to the first direction. In detail, regions corresponding to the second domain BB1 and the third domain CC1 of the first subpixel electrode 191a and regions corresponding to the second domain BB2 and the third domain CC2 of the second subpixel electrode 191b are exposed and photo-aligned in the third direction.

Figure 13:
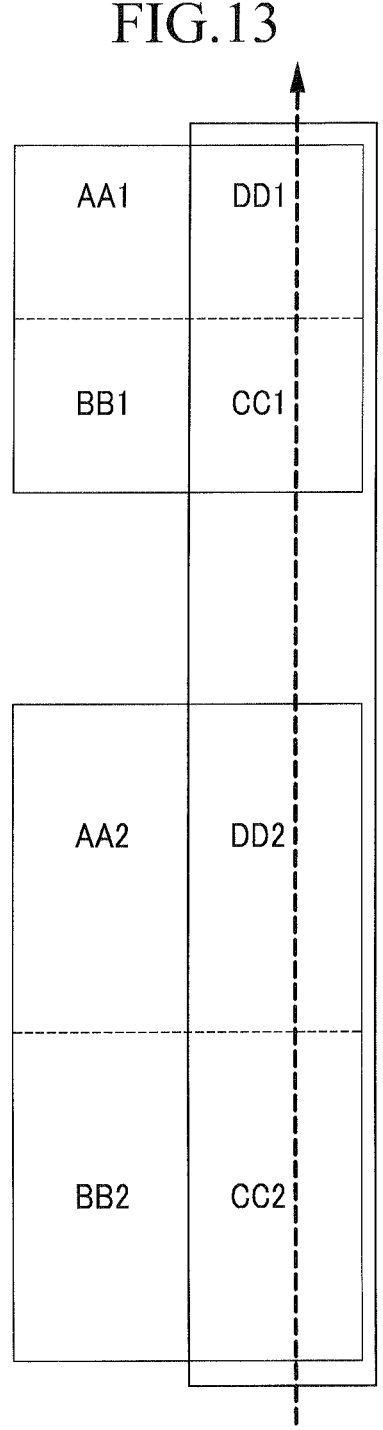

Next, as shown in FIG. 13, some regions of the second substrate are exposed and photo-aligned in a fourth direction. According to an embodiment, the fourth direction forms an angle of 90 degrees or about 90 degrees with the third direction. In detail, regions corresponding to the third domain CC1 and the fourth domain DD1 of the first subpixel electrode 191a and regions corresponding to the third domain CC2 and the fourth domain DD2 of the second subpixel electrode 191b are exposed and photo-aligned in the fourth direction.

Thereafter, the liquid crystal molecules corresponding to each respective subpixel are aligned with the pretilts in different directions in each domain by arranging the first substrate and the second substrate and interposing a liquid crystal layer between the two substrates.

Figure 14:
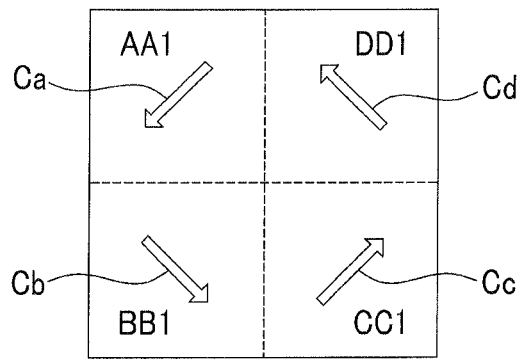
Figure 14:
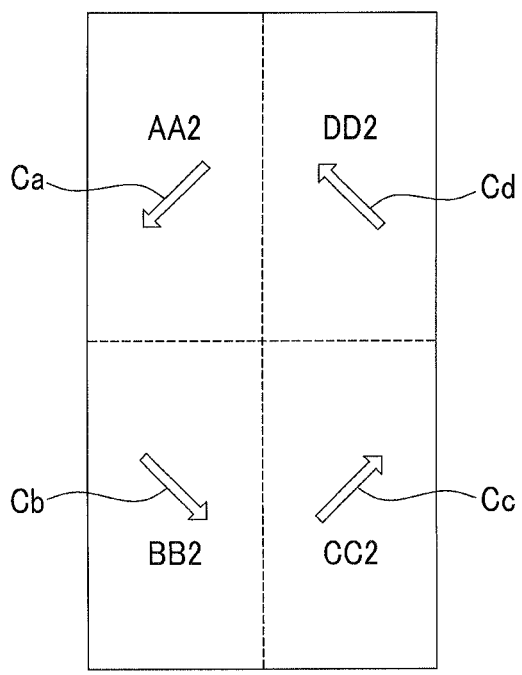

As a result, as shown in FIG. 14, in the first domain AA1 of the first subpixel electrode 191a and the first domain AA2 of the second subpixel electrode 191b, the first substrate is exposed twice and the second substrate is not exposed.

Accordingly, the liquid crystal molecules are photo-aligned with the pretilt direction in the lower left direction Ca by the vector sum of the two exposure directions of the first substrate in the first domain.

In the second domain BB1 of the first subpixel electrode 191a and the second domain BB2 of the second subpixel electrode 191b, the first substrate is exposed and photo-aligned in the second direction and the second substrate is exposed and photo-aligned in the third direction which is perpendicular to the second direction. Accordingly, the liquid crystal molecules are photo-aligned with the pretilt direction in the lower right direction Cb by the vector sum of the pretilt direction of the first substrate and the pretilt direction of the second substrate in the second domain.

In the third domain CC1 of the first subpixel electrode 191a and the third domain CC2 of the second subpixel electrode 191b, the first substrate is not exposed and photo-aligned. The second substrate is exposed and photo-aligned twice, that is, in the third direction and the fourth direction. Accordingly, the liquid crystal molecules are photo-aligned with the pretilt direction in the upper right direction Cc obtained by the vector sum of the two exposure directions of the second substrate in the third domain.

In the fourth domain DD1 of the first subpixel electrode 191a and the fourth domain DD2 of the second subpixel electrode 191b, the first substrate is photo-aligned once in the first direction and the second substrate is photo-aligned once in the fourth direction. Accordingly, the liquid crystal molecules are photo-aligned with the pretilt direction in the upper left direction Cd by the vector sum of the pretilt direction of the first substrate and the pretilt direction of the second substrate.

As described above, in the photo-alignment method according to an exemplary embodiment of the present invention, some regions of the same substrate are exposed twice in the directions forming the angle of 90 degrees or about 90 degrees with each other and two different regions of two different substrates are exposed in directions opposite to each other.

As a result, in the case of the first substrate, the first domains AA1 and AA2 are exposed and photo-aligned twice, that is in the first direction and the second direction, and the second domains BB1 and BB2 are exposed and photo-aligned once in the second direction. The third domains CC1 and CC2 are not photo-aligned and the fourth domains DD1 and DD2 are exposed and photo-aligned once in the first direction.

In the case of the second substrate, the first domains AA1 and AA2 are not photo-aligned and the second domains BB1 and BB2 are exposed and photo-aligned once in the third direction. The third domains CC1 and CC2 are exposed and photo-aligned twice, that is in the third direction and the fourth direction, and the fourth domains DD1 and DD2 are exposed and photo-aligned once in the fourth direction.

In the photo-alignment method according to an embodiment of the present invention, the first domains AA1 and AA2 and the third domains CC1 and CC2 are aligned with the pretilt by the exposure direction of a photo-aligned substrate by exposing and photo-aligning any one substrate of the first substrate and the second substrate twice in directions perpendicular to each other and not photo-aligning the other substrate, and the second domains BB1 and BB2 and the fourth domains DD1 and DD2 are aligned with the pretilt by the vector sum obtained by exposing and photo-aligning each of the first substrate and the second substrate once in directions perpendicular to each other, respectively.

According to an embodiment, when the same substrate is exposed and photo-aligned twice, a light amount in the first exposure may be about three times more than the light amount of the second exposure.

As described above, according to manufacturing methods of the liquid crystal display according to exemplary embodiments of the present invention, in at least one of the plurality of domains, any one of the two substrates facing each other is not photo-aligned and only the remaining substrate is photo-aligned. Accordingly, when the two substrates are arranged to face each other, even though an arrangement error may occur, an error of the pretilt direction due to the arrangement error of the two substrates may be reduced or prevented. In more detail, in at least one of the plurality of domains, since any one of the two substrates facing each other is not photo-aligned and only the other substrate is photo-aligned, the pretilt direction of the liquid crystal molecules according to the photo-alignment is determined by only one photo-aligned substrate, and is, therefore, not influenced by the arrangement error. Therefore, unlike the case where both substrates facing each other are photo-aligned in all the domains such that the pretilt direction of the liquid crystal molecules is determined by the vector sum of the photo-alignment directions of the two substrates in all of the domains, pretilt direction error due to an arrangement error of the two substrates may be reduced or prevented.

According to a manufacturing method according to an exemplary embodiment of the present invention, the first direction and the second direction, and the third direction and the fourth direction may be opposite to the directions described in the manufacturing methods according to the exemplary embodiments described in connection with FIGS. 4-8 and 10-14, and the exposure regions may also be changed.

Figure 15:
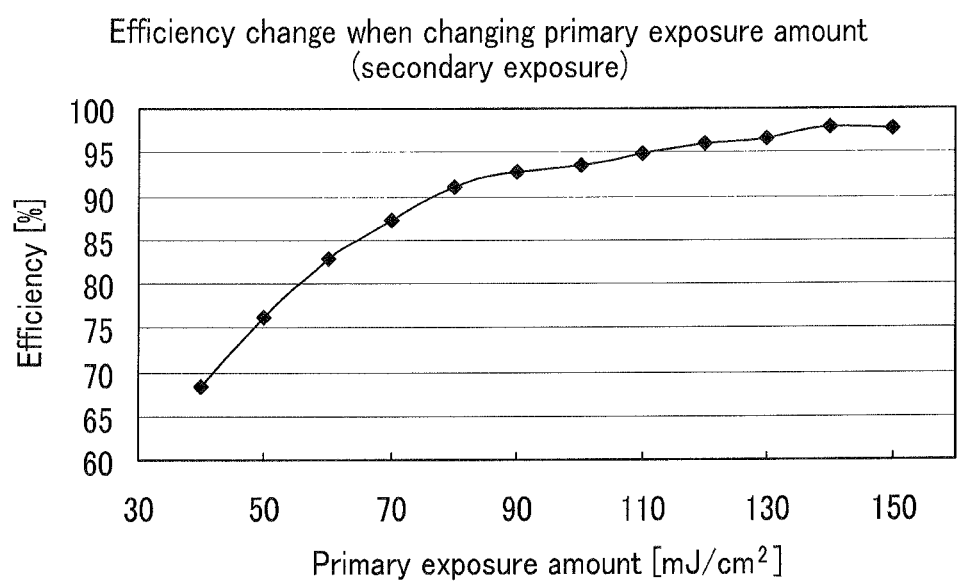
FIG. 15 is a graph of alignment efficiency depending on an exposure amount in a first alignment and an exposure amount in a second alignment according to an experimental example of an embodiment of the present invention.

Alignment efficiency according to an exposure amount in a first alignment and an exposure amount in a second alignment according to an experimental example of an embodiment of the present invention is described with reference to FIG. 15. FIG. 15 is a graph of alignment efficiency depending on an exposure amount in a first alignment and an exposure amount in a second alignment according to an experimental example of an embodiment of the present invention.

Referring to FIG. 15, in the experimental example, while the exposure amount in the first exposure was changed based on the exposure amount in the second exposure, the first exposure efficiency was calculated to be represented by a graph. Here, the second exposure amount was 50 mJ/cm$^2$.

Referring to FIG. 15, when the first exposure energy is three times more than the second exposure energy (the first exposure energy is about 150 mJ/cm$^2$), the influence on the first exposure and the second exposure was almost the same. That is, when the exposure energy in the first exposure was approximately three times the exposure energy in the second exposure, the primary exposure efficiency corresponded to about 98% of the secondary exposure and was almost the same as the secondary exposure efficiency. Accordingly, like the manufacturing methods of the liquid crystal display according to the exemplary embodiments of the present invention, when the substrate was exposed twice, the exposure energy in the first exposure can be about three times of the exposure energy in the second exposure.

Figure 16:
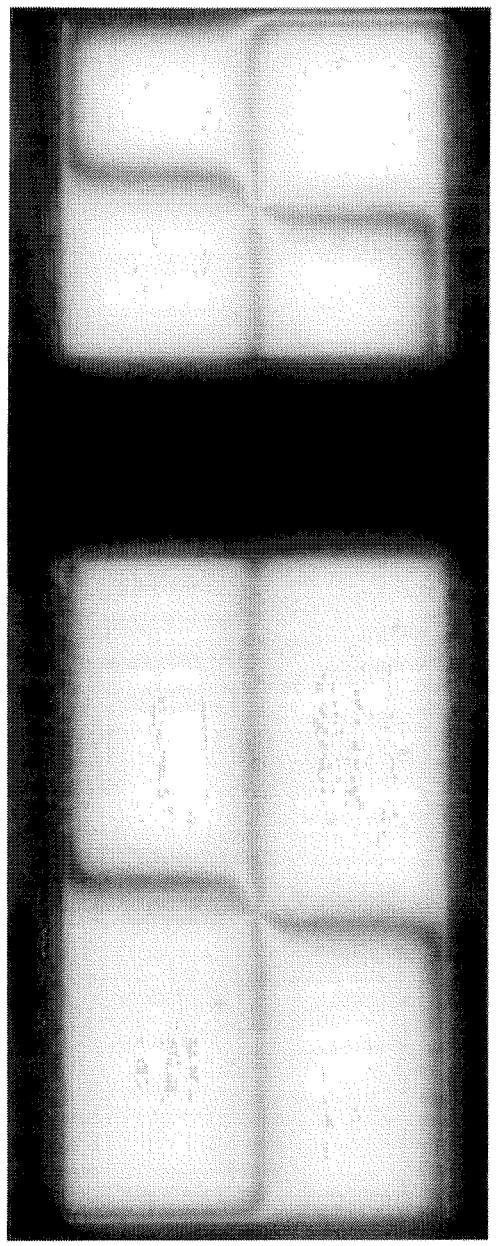
FIG. 16 is a diagram illustrating a domain implementation result of a liquid crystal display according to an experimental example of an embodiment of the present invention.

A domain implementation result of a liquid crystal display according to an experimental example of an embodiment of the present invention will be described with reference to FIG. 16. FIG. 16 is a diagram illustrating a domain implementation result of a liquid crystal display according to an experimental example of an embodiment of the present invention.

In the experimental example, a pixel similar to the exemplary embodiment shown in FIG. 9 was formed, the photo-alignment was performed like the exemplary embodiment shown in FIGS. 10 to 13, an electric field was formed in the pixel, and then, the pixel was photographed. Referring to FIG. 16, like the exemplary embodiment of the present invention, when the plurality of domains were formed by the photo-alignment, the plurality of domains were formed well.

According to the exemplary embodiments of the present invention, the pretilt directions of the plurality of domains are laid out in a clockwise or counterclockwise direction. In addition, based on the pixel structure, the pretilt direction can be a direction converging on the center of the pixel area and can be a direction diverging from the center of the pixel area.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display, comprising:
a first substrate and a second substrate each having a plurality of unit pixel areas, wherein the first and second substrates face each other; and
a liquid crystal layer between the first substrate and the second substrate,
wherein: each of the plurality of unit pixel areas includes a plurality of domains, in a first domain of the plurality of domains, a first alignment layer of the first substrate and a second alignment layer of the second substrate are photo-aligned, and in a second domain of the plurality domains, the second alignment layer of the second substrate is photo-aligned twice and the first alignment layer of the first substrate is not photo-aligned.

2. The liquid crystal display of claim 1, wherein: in the first domain, the first alignment layer of the first substrate is exposed and photo-aligned in a first direction and the alignment layer of the second substrate is exposed and photo-aligned in a second direction, in the second domain, the second alignment layer of the second substrate is exposed and photo-aligned the second direction and exposed and photo-aligned in a third direction, the first direction forms angle of 90 degrees with the second direction, and the second direction forms an angle of 90 with the third direction.

3. The liquid crystal display of claim 2, wherein: photo-alignment directions of first domain and the second domain form an angle of 90 degrees with each other.

4. The liquid crystal display of claim 3, further comprising: a third domain of the plurality of domains photo-aligned in a direction forming an angle of 180 degrees with the photo-photo-alignment direction of the first domain, wherein in the third domain, the first alignment of the first substrate is exposed and photo-aligned in the third direction and the second alignment layer of the second substrate is exposed and photo-aligned in a fourth direction, and the fourth direction is opposite to the second direction.

5. The liquid crystal display of claim 4, further comprising: a fourth domain of plurality of domains photo-aligned in a direction forming an angle of 90 degrees with a photo-photo-alignment direction of the third domain, wherein in the fourth domain, the first alignment layer of the first substrate is exposed and photo-aligned in the first direction and exposed and photo-aligned in the fourth direction, and the second alignment layer of the second substrate is not photo-aligned.

6. The liquid crystal display of claim 2, further comprising:
a third domain of the plurality of domains photo-aligned in a direction forming an angle of 180 degrees with a photo-photo-alignment direction of the first domain, wherein in the third domain, the first alignment of the first substrate is exposed and photo-aligned in the third direction and the second alignment layer of the second substrate is exposed and photo-aligned in a fourth direction, and the fourth direction is opposite to the second direction.

7. The liquid crystal display of claim 6, further comprising:
a fourth domain of plurality of domains photo-aligned in a direction forming an angle of 90 degrees with a photo-photo-alignment direction of the third domain, wherein in the fourth domain, the first alignment layer of the first substrate is exposed and photo-aligned in the first direction and exposed and photo-aligned in the fourth direction, and the second alignment layer of the second substrate is not photo-aligned.

8. A liquid crystal display, comprising:
a first substrate and a second substrate each having a plurality of unit pixel areas, wherein the first and second substrates face each other; and
a liquid crystal layer between the first substrate and the second substrate,
wherein: the plurality of unit pixel areas each have a plurality of domains, a first alignment layer of the first substrate is exposed and photo-aligned once in a first direction in a first domain, first alignment layer of the first substrate is not photo-aligned in a second domain, the first layer of the first substrate is exposed and photo-aligned once in a second direction in a third and the first alignment layer of the first substrate is exposed and photo-aligned in the first direction and exposed and photo-aligned in the second direction in a fourth domain.

9. The liquid crystal display of claim 8, wherein: the first direction forms an of 90 degrees with the second direction.

10. The liquid crystal display of claim 9, wherein: a second alignment layer of the second substrate is exposed and photo-aligned once in a third direction in the first domain, the second alignment layer of the second substrate is exposed and photo-aligned in the third direction and exposed and photo-aligned in a fourth direction in the second domain, the second alignment layer of the second substrate is exposed and photo-aligned once in the fourth direction in the third domain, and the second alignment layer of the second substrate is not photo-aligned in the fourth domain.

11. The liquid crystal display of claim 10, wherein: the third direction forms an angle of 90 degrees with the fourth direction.

12. The liquid crystal display of claim 11, wherein: the first direction is opposite the third direction and the second direction is opposite to the fourth direction.

13. A method of manufacturing a liquid crystal display, comprising:
photo-aligning first region of a first alignment layer in a of a first substrate in a first directiophoto-aligning a second region of the first alignment layer of the first substrate in a second direction;
photo-aligning a first region of a second alignment layer of a second substrate in a third direction;
photo-aligning a second region of the second alignment layer of the second substrate in a fourth direction; and
arranging the first substrate and the second substrate to face each other,
wherein the first direction forms an angle of 90 degrees with the second direction and the third direction forms an angle of 90 degrees with the fourth direction, the second region the first alignment layer and the second region of the second alignment layer do not overlap with each other, and the first region of the first alignment layer and the second region of the first alignment layer partially overlap with each other.

14. The method of claim 13, wherein: the first region of the first alignment layer and the first region of the second alignment layer do not overlap with each other.

15. The method of claim 13, wherein: the first region of the second alignment layer and the second region of the second alignment layer partially overlap with each other.

* * * * *